(12) United States Patent
Feng et al.

(10) Patent No.: US 12,535,098 B2
(45) Date of Patent: Jan. 27, 2026

(54) DETACHABLE ATTACHMENT STRUCTURE

(71) Applicant: TILTA INC., Burbank, CA (US)

(72) Inventors: Zhichao Feng, Shenzhen (CN);
Wenping Zeng, Shenzhen (CN);
Kefeng Zhou, Shenzhen (CN)

(73) Assignee: TILTA INC., Burbank, CA (US)

(*) Notice: Subject to any disclaimer, the term of this patent is extended or adjusted under 35 U.S.C. 154(b) by 0 days.

(21) Appl. No.: 18/605,051

(22) Filed: Mar. 14, 2024

(65) Prior Publication Data
US 2025/0060001 A1 Feb. 20, 2025

(30) Foreign Application Priority Data
Aug. 17, 2023 (CN) .......................... 202322226760.1

(51) Int. Cl.
*F16B 47/00* (2006.01)
*F16M 11/10* (2006.01)
*F16M 11/20* (2006.01)
*F16M 13/02* (2006.01)

(52) U.S. Cl.
CPC ............. *F16B 47/00* (2013.01); *F16M 11/10* (2013.01); *F16M 11/2092* (2013.01); *F16M 13/022* (2013.01); *F16M 2200/025* (2013.01); *F16M 2200/08* (2013.01)

(58) Field of Classification Search
CPC .. F16M 11/10; F16M 13/022; F16M 11/2092; F16M 2200/025; F16M 2200/08; F16B 47/00
See application file for complete search history.

(56) References Cited

U.S. PATENT DOCUMENTS

| | | | | |
|---|---|---|---|---|
| 6,390,424 B1* | 5/2002 | Kidushim | ............ | F16M 11/24 248/404 |
| 7,229,059 B1* | 6/2007 | Hood | ................. | F16M 13/022 248/205.8 |
| 7,320,450 B2* | 1/2008 | Carnevali | ............ | F16M 11/14 248/180.1 |
| 7,774,973 B2* | 8/2010 | Carnevali | ............ | F16M 11/10 248/516 |
| 7,878,467 B2* | 2/2011 | Chen | ...................... | F16B 47/00 248/205.8 |
| 8,109,479 B1* | 2/2012 | Tsai | ...................... | F16M 11/08 248/205.5 |

(Continued)

FOREIGN PATENT DOCUMENTS

CN 205905910 U 1/2017

*Primary Examiner* — Monica E Millner
(74) *Attorney, Agent, or Firm* — LOZA & LOZA, LLP; Derek Yeung

(57) ABSTRACT

The present disclosure belongs to the field of suction cups, in particular to a user-friendly detachable attachment structure, wherein comprising installation components and suction-based adsorption components. The installation components consist of a clamping part on one side, equipped with a clamping position to detachably clamp the adsorption component, and a fixed part on the other side with a connection position for linking external structures. In the present disclosure, the harmonized arrangement of the fixed part and clamping part facilitates effortless disassembly and replacement of the adsorption component when necessary, significantly enhancing user convenience.

9 Claims, 4 Drawing Sheets

(56) References Cited

U.S. PATENT DOCUMENTS

| | | | | |
|---|---|---|---|---|
| 8,480,044 | B2* | 7/2013 | Liao | F16M 11/14 |
| | | | | 269/95 |
| 9,611,881 | B2* | 4/2017 | Khodapanah | F16B 21/06 |
| 2008/0245935 | A1* | 10/2008 | Kaneda | F16M 11/105 |
| | | | | 248/206.2 |
| 2014/0367535 | A1* | 12/2014 | Rost | F16M 11/10 |
| | | | | 248/122.1 |
| 2022/0041252 | A1* | 2/2022 | Gonzales | B63B 21/00 |
| 2023/0122895 | A1* | 4/2023 | Alesi | F16M 13/022 |
| | | | | 248/346.01 |
| 2023/0279897 | A1* | 9/2023 | Gintner | F16B 47/00 |
| | | | | 211/70.6 |
| 2023/0340987 | A1* | 10/2023 | Aggarwal | F16M 13/022 |
| 2024/0034246 | A1* | 2/2024 | Aggarwal | F16B 47/00 |
| 2025/0058723 | A1* | 2/2025 | Feng | F16M 11/2092 |

* cited by examiner

DETACHABLE ATTACHMENT STRUCTURE

CROSS-REFERENCE TO RELATED APPLICATIONS

The present Application for patent claims priority to and the benefit of pending Chinese Application No. 2023222267601, filed Aug. 17, 2023, and hereby expressly incorporated by reference herein as if fully set forth below in its entirety and for all applicable purposes.

TECHNICAL FIELD

The present disclosure belongs to the field of suction cups, in particular to a detachable attachment structure.

INTRODUCTION

In scenarios where a car camera mount is needed, utilizing multiple suction cups to affix or attach the camera to a vehicle is common. During the installation or replacement of suction cups, rapid assembly or disassembly is necessary to ensure the timely completion of filming using the camera.

However, existing suction cup structures often prove cumbersome to disassemble efficiently. For instance, a first prior art discloses a vehicle-mounted suction cup tripod (Chinese Application Number: CN205905910U). The objective is to present a simple, cost-effective, and user-friendly camera-fixing device. It comprises a tripod body with three support legs, and a gimbal connection plate fixedly installed on the tripod body. The bottom plate of the gimbal connection plate exhibits three outward protruding structures, each featuring a through hole. These through holes connect to the upper end of the support leg through a ball joint. The suction cup is linked to the lower end of the support leg via a suction cup connector. This design allows for a 360-degree adjustable connection via ball joints. The suction cup in the first prior art is connected via a ball joint, which is essentially a ball head that can be movably limited in a bowl-shaped groove (e.g., socket) and rotated around the groove to adjust direction. However, replacing the suction cup becomes challenging when damaged.

BRIEF SUMMARY

To address the aforementioned challenges, aspects of the present disclosure introduce a user-friendly detachable attachment structure. This attachment structure facilitates seamless disassembly and replacement in the event of structural damage during usage.

A convenient detachable attachment structure, comprising:
  Adsorption components for suction; and
  An installation component, featuring a clamping part and a fixed part, wherein the clamping part and fixed part are interconnected, and the clamping part encompasses a clamping position to detachably clamp the adsorption component.
  The fixed part is equipped with a connection position for linking external structures.
  In the attachment structure, the harmonized arrangement of the fixed part and clamping part facilitates effortless disassembly and replacement of the adsorption component when necessary, significantly enhancing user convenience.
  Furthermore, the structure also incorporates a locking part aligned with the clamping position, the locking part being movably connected to the clamping part, and its mobility at the clamping part enables the locking or releasing of the attachment structure.

Furthermore, the adsorption component includes:
  A suction cup for effective adsorption;
  Connecting components, with one side linked to the suction cup and the other side featuring a slider, the clamping position being a sliding groove, and the slider being detachably movable within the sliding groove, with the locking part capable of moving at the clamping part to lock or release the slider.

Furthermore, the entrance ends on both sides of the slider in the sliding groove are arranged with guiding segments, ensuring a guided sliding connection between the sliding groove and the slider along the segments.

Furthermore, elastic limiting components are positioned at both ends of the slider to prevent the clamping part from sliding off the slider, with these elastic limiting components protruding from the surface of the slider.

Furthermore, the adsorption component further encompasses a connected control module and a suction cup, and the connecting component features a mounting groove on the side opposite to the clamping part, allowing the control module to extend into the mounting groove.

Furthermore, one end of the connecting component extends from the side of the suction cup, forming a guiding wall with a guiding space, which is linked to the entrance end of the mounting groove, and the control module is installed along the guiding space within the mounting groove.

Furthermore, the locking part comprises a locking block, a locking screw, and a rotating handle; the locking block aligns with the position of the sliding groove, and one end of the locking screw is connected to the rotating handle; the other end of the locking screw traverses through the locking block to movably connect to the clamping part; the locking screw is operatively connected to the locking block; turning the rotating handle causes the locking block to move relative to the clamping part, thereby locking or releasing the slider.

Furthermore, a first clamping bracket is included in the attachment structure; on the side opposite to the clamping part, the fixed part features a second clamping bracket; one end of the first clamping bracket is pivotally connected to one end of the second clamping bracket, and the other end of the first clamping bracket is detachably connected to the other end of the second clamping bracket, forming the connection position.

Furthermore, the structure also incorporates a locking handle; the second clamping bracket extends to create a first extension segment, and the first clamping bracket extends to form a second extension segment; the first extension segment extends downward from the side opposite to the clamping bracket, forming fixed support; the locking handle sequentially passes through the second extension segment and the first extension segment and reaches the fixed support, enabling detachable connection of the first and second extension segments.

The beneficial effect of the present disclosure lies in that the harmonized arrangement of the fixed part and clamping part facilitates effortless disassembly and replacement of the adsorption component when necessary, significantly enhancing user convenience.

NUMBERING EXPLANATION

10—Attachment structure; 101—External structure;
1—Attachment component; 11—Suction cup; 12—Connecting component; 121—First protrusion; 122—mounting groove; 13—Slider; 131—Guiding segment; 132—Entrance end; 14—Retractable limiting component;
2—Installation component; 21—Locking part; 211—Locking block; 212—Locking screw; 213—Rotating handle; 22—Clamping part; 221—Sliding groove; 222—Accommodation groove; 223—Second protrusion; 224—Third protrusion; 225—Clamping position; 23—Fixed part; 231—Second clamping bracket; 232—Connection position; 233—Fixed support; 234—Mounting hole; 235—First extension segment; 24—First clamping bracket; 25—Locking handle.

DETAILED DESCRIPTION

To elucidate the purpose, technical solution, and aspects of the present disclosure, a detailed description is presented in conjunction with the accompanying drawings and embodiments. It is important to note that the specific embodiments outlined herein are intended solely for explanatory purposes and do not serve to limit the scope of the present disclosure.

Figure 1:
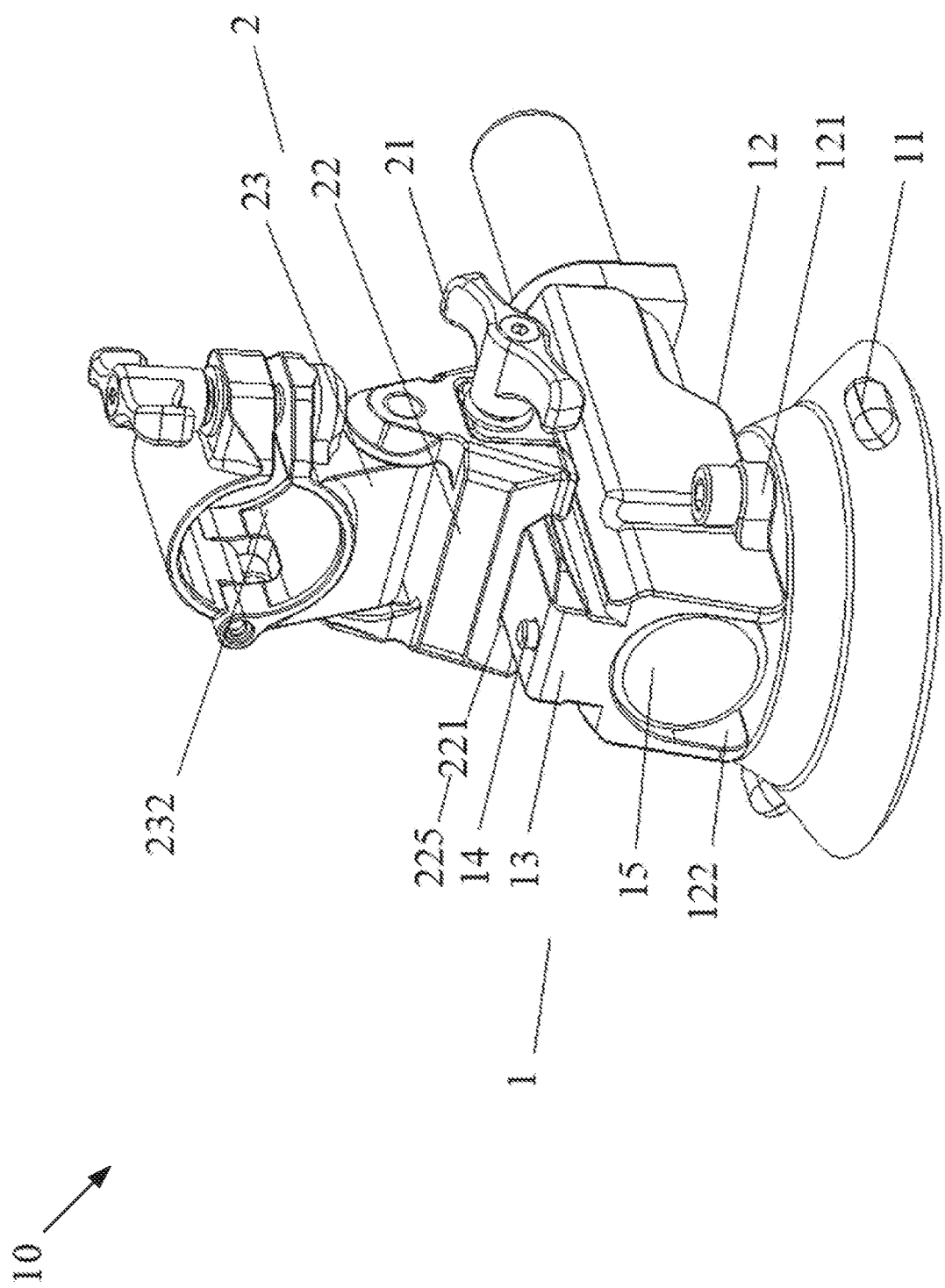
FIG. 1 is a schematic diagram of a detachable attachment structure according to some aspects of the present disclosure.
Figure 2:
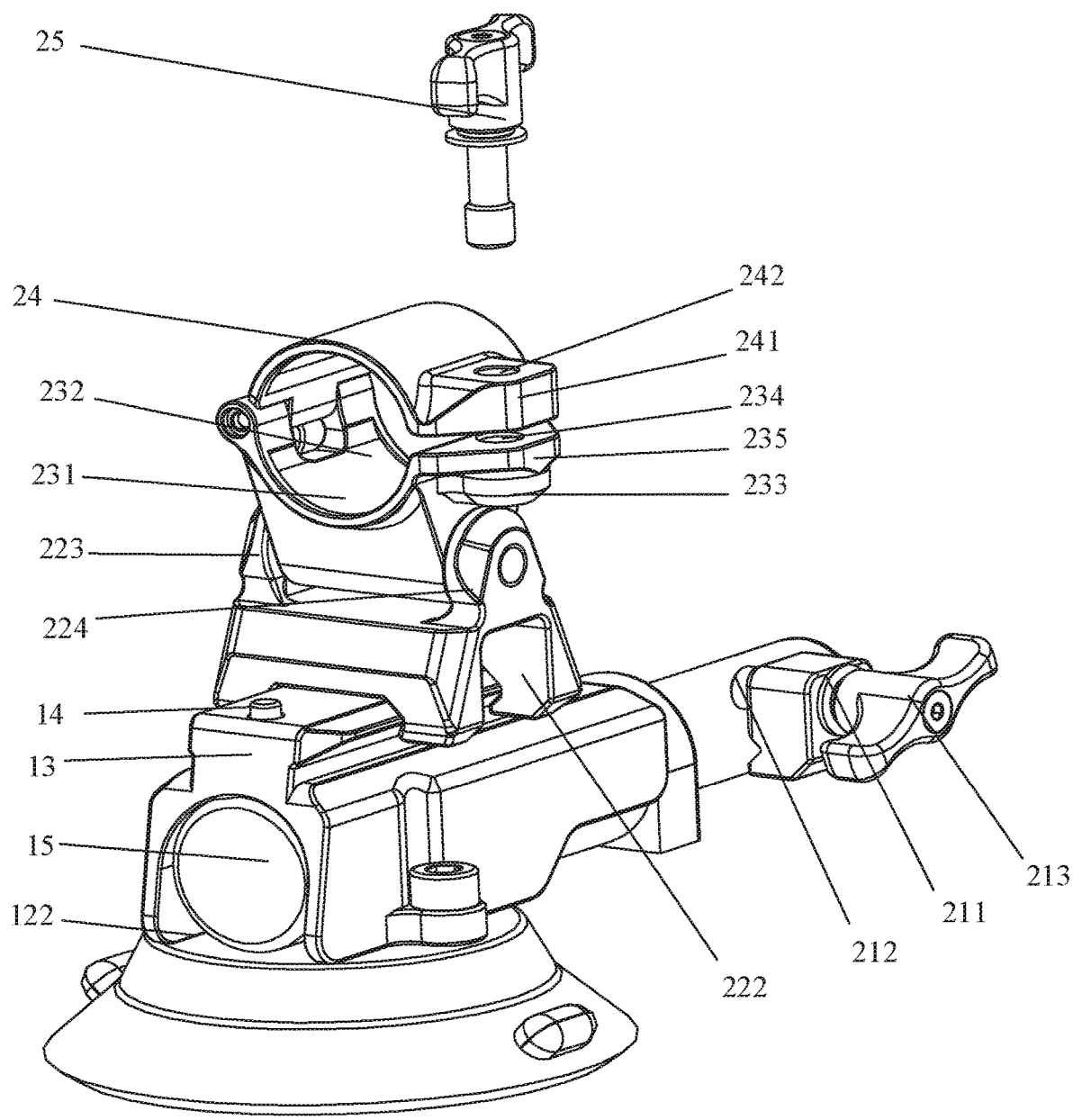
FIG. 2 is an exploded view of the detachable attachment structure according to some aspects of the present disclosure.
Figure 3:
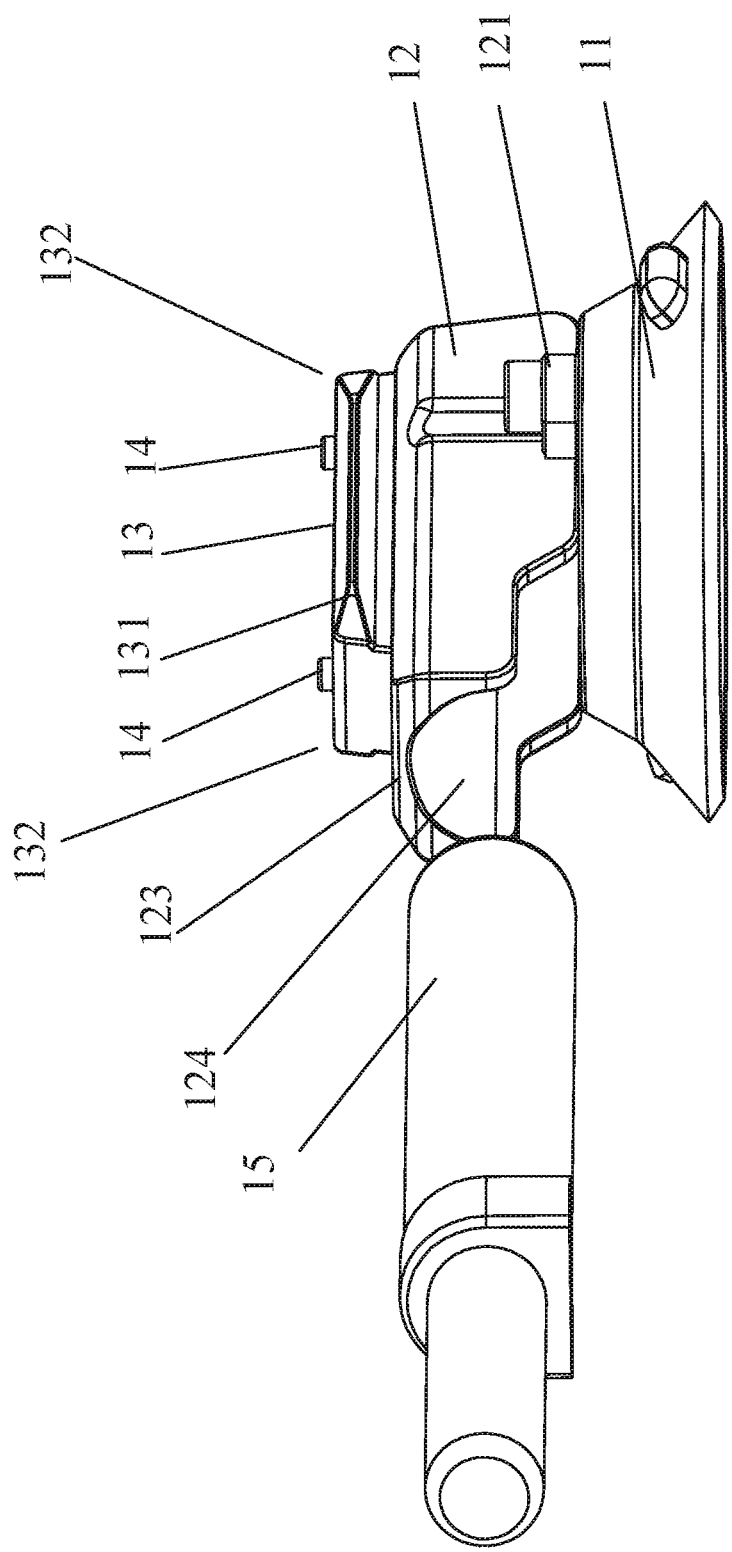
FIG. 3 is a schematic diagram of an attachment component according to some aspects of the present disclosure.
Figure 4:
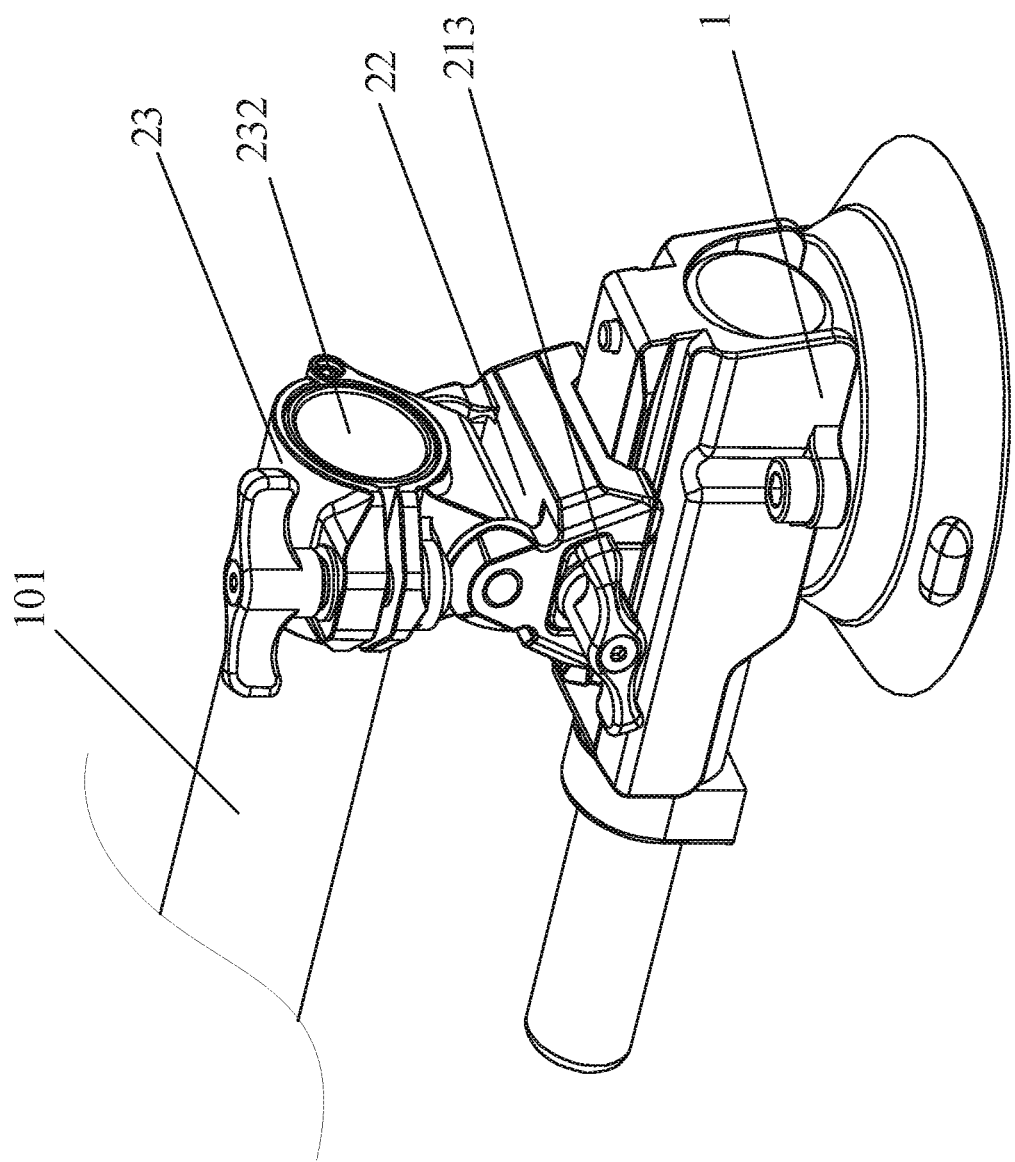
FIG. 4 is a schematic diagram of a detachable attachment structure installed with an external structure.

Referring to FIGS. 1-4, an exemplary embodiment introduces a user-friendly detachable attachment structure 10, comprising an attachment component 1 and an installation component 2. The attachment component may be referred to as an adsorption component in this disclosure. The attachment component 1 is designed to be attached onto a vehicle by suction, and the installation component 2 comprises a clamping part 22 and a fixed part 23. The fixed part 23 features a connection position 232 for linking (or connecting) with external structures. For example, the external structure can be the main body of a car camera mount. One side of the clamping part 22 is connected to the fixed part 23, while the other side is equipped with a clamping position 225 for detachably securing the attachment component 1, which is clamped at the clamping position 225.

In this embodiment, when replacement of the attachment component 1 is necessary, a user manipulates the clamping part 22, detaches the attachment component 1 to be replaced, and installs a new attachment component 1 on the clamping part 22, thus facilitating the swift disassembly and replacement of the attachment component 1. In essence, in situations where the attachment component 1 is damaged during the filming process, this embodiment enables the prompt replacement of the damaged attachment component 1 with a new one, ensuring the seamless progression of filming using a camera connected with the attachment structure.

In some aspects, the attachment structure 10 incorporates a locking part 21 corresponding to the position of the clamping part 22. The locking part 21 is movably connected to the clamping part 22 and can rotate relative to the clamping part 22 to either release or lock the adsorption component 1.

When the need arises to replace the attachment component 1, a simple rotation of the locking part 21 facilitates the removal of the attachment component 1. Subsequently, the new attachment component 1 is mounted on the clamping part 22, and the locking part 21 is engaged to secure the new attachment component 1. This ensures that the locking part 21 coordinates seamlessly with the clamping part 22, effectively locking the new attachment component 1 and completing the disassembly and replacement process. In summary, in this embodiment, a straightforward rotation of the locking part 21 enables the disassembly of the attachment component 1, simplifying the overall disassembly procedure.

In some aspects, the attachment component 1 comprises a suction cup 11 and a connecting component 12. One side (a first side) of the connecting component 12 is affixed to the suction cup 11, while the other side (a second side) extends to form a slider 13. The clamping part 22, situated on the side away from the fixed part 23, features a sliding groove 221, with the clamping position 225 located within the sliding groove 221. The slider 13 is detachably and slidably positioned within the sliding groove 221, and the locking part 21 can be adjusted relative to the clamping part 22 to secure the slider 13 within the sliding groove 221.

In some aspects, the suction cup 11 adopts a suction structure commonly used for such applications.

In some aspects, entrance ends 132 featuring guiding segments 131 are incorporated on both sides of the slider 13, with the sliding groove 221 aligned along the guiding segments 131. The entrance end 132, in this embodiment, designates the point where the slider 13 initiates its entry into the sliding groove 221. For instance, when the right end of the slider 13 moves into the sliding groove 221 from the left end, the right end of the slider 13 is considered the entrance end 132. During the process of disassembling and replacing the attachment component 1, the guiding segments 131 expedite the swift movement of the slider 13 into the sliding groove 221. This configuration enhances the efficiency of the disassembly and replacement of the attachment component 1.

In some aspects, the attachment component 1 also includes multiple limiting components 14 (e.g., retractable or elastic limiting components), two of which are flexibly (or retractably) attached to both ends of the slider 13, protruding from its surface. Specifically, when subjected to external force, the limiting components 14 retract into the slider 13, and upon release of the external force, they rebound, protruding from the surface of the slider 13. This mechanism restricts both ends of the clamping part 22, preventing it from sliding off the slider 13 when the locking part 21 is not engaged.

In some aspects, both sides of the connecting component 12 are equipped with a first protrusion 121, and on the side opposite to the slider 13, a mounting groove 122 is provided. The control module 15 of the suction cup 11 can be detachably installed in the mounting groove 122, with the first protrusion 121 securely connected to the surface of the suction cup 11 using screws.

In some aspects, the connecting component 12 features a guiding space 124 on the guiding wall 123 located at the entrance end of the mounting groove 122. Particularly, this facilitates the seamless insertion of the control module 15 into the mounting groove 122. The presence of the guiding space 124 minimizes structural interference between the groove wall of the mounting groove 122 and the insertion of the control module 15. Additionally, the guiding space 124 increases the clearance area between the connecting component 12 and the suction cup 11, serving as a buffer. As the user inserts or removes the control module 15, the hand of the user is protected from contact with sharp corners on the groove wall of the mounting groove 122, thus averting unexpected injuries. It is important to note that the groove walls within the guiding space 124 are designed with smooth transitions (e.g., a smooth surface).

In some aspects, the control module 15 encompasses all modules responsible for managing the suction of the suction cup, such as a vacuum pump, pipes, circuit boards, etc. The mentioned control module 15 aligns with existing technological standards.

In some aspects, the locking part 21 comprises a locking block 211, a locking screw 212, and a rotating handle 213. Accommodation grooves 222 are introduced on either side wall of the sliding groove 221. The locking block 211 accommodated in the accommodation groove 222 aligns with the position of the sliding groove 221, and one end (a first end) of the locking screw 212 is connected to the rotating handle 213; the other end (a second end) of the locking screw 212 traverses through the locking block 211 to movably connect to the clamping part 22. Turning the rotating handle 213 causes the locking block 211 to move relative to the clamping part 22, thereby locking or releasing the slider 13.

In some aspects, the second protrusion 223 and the third protrusion 224 are arranged relatively on the side of the clamping part 22, away from the sliding groove 221. The fixed part 23 is pivotally connected between the second protrusion 223 and the third protrusion 224 through a pivot, enabling rotation of the fixed part 23 relative to the clamping part 22. This design allows the attachment component 1 to adapt to varying inclined surfaces. For instance, different car models may present varying degrees of inclination on their surfaces. Consequently, when attaching the attachment component 1 to the surface, the fixed part 23 connected to the car camera mount may exhibit a distinct inclination angle. Hence, in this embodiment, the adjustable inclination angle between the clamping part 22 and the fixed part 23 ensures proper alignment of the car camera mount with the mounting surface.

In some aspects, a first clamping bracket 24 is present in this embodiment. On the side away from the clamping part 22, a second clamping bracket 231 is positioned on the fixed part 23. The first clamping bracket 24 and the second clamping bracket 231 collaborate to form a connection position 232 for securing the car camera mount. One end (a first end) of the second clamping bracket 231 is connected to the first extension segment 235, while the other end (a second end) is pivotally connected to the first clamping bracket 24. The first clamping bracket 24 encompasses a second extension segment 241, and the first extension segment 235 and the second extension segment 241 are detachably connected to adjust the dimensions of the connection position 232, accommodating car camera mounts of different diameters.

In some aspects, a locking handle 25 is included in this embodiment. A through-hole 242 is provided on the second extension segment 241, and on the side away from the second extension segment 241, the first extension segment 235 protrudes and extends to form a fixed support 233. A mounting hole 234 is introduced on the first extension segment 235, longitudinally extending to the fixed support 233. The locking handle 25 is threaded successively through the through-hole 242 and the mounting hole 234 to secure the first extension segment 235 and the second extension segment 241. This collaborative mechanism of the first clamping bracket 24 and the second clamping bracket 231 enables adaptability to various sizes and models of clamped car camera mounts. The fixed support 233 holds up the lower section of the locking handle 25, enhancing the stability of the connection between the first clamping bracket 24 and the second clamping bracket 231. For instance, it ensures the structural integrity of the first extension segment 235 and prevents potential breakage under downward pressure during the tightening of the locking handle 25. It is noteworthy that the bottom of the fixed support 233 converges towards the centerline of the mounting hole 234 to prevent the locking handle 25 from protruding beyond the fixed support 233, thereby mitigating the risk of accidental injury to the user.

The foregoing represents only one preferable embodiment of the present disclosure and is not intended to restrict its scope. Any modifications, equivalent replacements, and enhancements made within the spirit and principles of the present disclosure should be encompassed within the protective scope of the present disclosure.

What is claimed is:

1. A detachable attachment structure, comprising:
   an adsorption component configured to attach the detachable attachment structure to a surface;
   an installation component, comprising a clamping part and a fixed part, the clamping part pivotally connected to the fixed part that is rotatable relative to the clamping part, and the clamping part comprising a sliding groove configured to detachably and slidably clamp on a slider of the adsorption component;
   the fixed part comprising a connection position configured to link to an external structure,
   wherein a first entrance end and a second entrance end on respective sides of the slider comprises guiding segments, and the sliding groove is movably connected to the slider along the guiding segments; and
   wherein the slider is movably provided with a limiting component at each end of the slider to prevent the clamping part from sliding off the slider, with the limiting component protruding from a surface of the slider.

2. The detachable attachment structure according to claim 1, further comprising:
   a locking part movably connected to the clamping part to lock or release the adsorption component.

3. The detachable attachment structure according to claim 2, wherein the adsorption component comprises:
   a suction cup; and
   a connecting component, with a first side of the connecting component being connected to the suction cup and a second side of the connecting component being equipped with the slider, and the slider being detachably movable within the sliding groove, with the locking part being configured to lock or release the slider by moving at the clamping part.

4. A detachable attachment structure, comprising:
   an adsorption component configured to attach the detachable attachment structure to a surface;
   an installation component, comprising a clamping part and a fixed part, the clamping part connected to the fixed part, and the clamping part comprising a sliding groove configured to detachably and slidably clamp on a slider of the adsorption component;
   the fixed part comprising a connection position configured to link to an external structure,
   wherein a first entrance end and a second entrance end on respective sides of the slider comprises guiding segments, and the sliding groove is movably connected to the slider along the guiding segments;

a locking part movably connected to the clamping part to lock or release the adsorption component;

wherein the adsorption component comprises:

a suction cup; and a connecting component, with a first side of the connecting component being connected to the suction cup and a second side of the connecting component being equipped with the slider, and the slider being detachably movable within the sliding groove, with the locking part being configured to lock or release the slider by moving at the clamping part; and wherein the slider is movably provided with a limiting component at each end of the slider to prevent the clamping part from sliding off the slider, with the limiting component protruding from a surface of the slider.

5. The detachable attachment structure according to claim 3, wherein the adsorption component further comprises a control module and the suction cup, and the connecting component comprises a mounting groove on a side opposite to the clamping part, the control module extending into the mounting groove.

6. The detachable attachment structure according to claim 5, wherein a first end of the connecting component extends from a side of the suction cup, forming a guiding wall, the guiding wall comprising a guiding space, with the guiding space cooperating with an entrance end of the mounting groove, and the control module being installed along the guiding space within the mounting groove.

7. A detachable attachment structure, comprising:

an adsorption component configured to attach the detachable attachment structure to a surface;

an installation component, comprising a clamping part and a fixed part, the clamping part connected to the fixed part, and the clamping part comprising a sliding groove configured to detachably and slidably clamp on a slider of the adsorption component;

the fixed part comprising a connection position configured to link to an external structure, wherein a first entrance end and a second entrance end on respective sides of the slider comprises guiding segments, and the sliding groove is movably connected to the slider along the guiding segments;

a locking part movably connected to the clamping part to lock or release the adsorption component;

wherein the adsorption component comprises:

a suction cup; and a connecting component, with a first side of the connecting component being connected to the suction cup and a second side of the connecting component being equipped with the slider, and the slider being detachably movable within the sliding groove, with the locking part being configured to lock or release the slider by moving at the clamping part;

wherein the locking part comprises a locking block, a locking screw, and a rotating handle;

the locking block aligns with the position of the sliding groove, and a first end of the locking screw is connected to the rotating handle; a second end of the locking screw traverses through the locking block to movably connect to the clamping part; the locking screw is operatively connected to the locking block; and wherein the locking block is configured to lock or release the slider by moving relative to the clamping part, in response to turning the rotating handle.

8. The detachable attachment structure according to claim 1, further comprising:

a first clamping bracket;

a second clamping bracket provided on a side of the fixed part; and a first end of the first clamping bracket is pivotally connected to a first end of the second clamping bracket, and a second end of the first clamping bracket is detachably connected to a second end of the second clamping bracket, forming the connection position.

9. The detachable attachment structure according to claim 8, further comprising:

a locking handle;

the second clamping bracket extending to form a first extension segment, and the first clamping bracket extending to form a second extension segment;

the first extension segment extending downward from a side opposite to the second extension segment, forming a fixed support; and the locking handle is configured to sequentially pass through the second extension segment and the first extension segment and reach the fixed support, enabling detachable connection of the first extension segment and the second extension segment.

* * * * *